United States Patent
Brown et al.

(10) Patent No.: US 8,311,699 B2
(45) Date of Patent: Nov. 13, 2012

(54) AUTOMATIC BRAKE VERIFICATION SYSTEM

(75) Inventors: Timothy Warren Brown, Erie, PA (US); Ajith Kuttannair Kumar, Erie, PA (US); Henry Todd Young, North East, PA (US)

(73) Assignee: General Electric Company, Schenectady, NY (US)

( * ) Notice: Subject to any disclaimer, the term of this patent is extended or adjusted under 35 U.S.C. 154(b) by 1301 days.

(21) Appl. No.: 12/026,976

(22) Filed: Feb. 6, 2008

(65) Prior Publication Data

US 2009/0198406 A1    Aug. 6, 2009

(51) Int. Cl.
*G01L 5/28* (2006.01)

(52) U.S. Cl. .......... 701/32.8; 701/70; 701/74; 701/31.4; 701/33.4; 701/33.9; 701/34.4; 303/122.03; 188/1.11 E; 340/453; 73/121; 73/128; 73/129

(58) Field of Classification Search .................. 701/29.1, 701/31.4–31.6, 32.8, 33.4, 33.5, 33.7–33.9, 701/34.4, 70, 74; 303/122, 122.02, 122.03, 303/122.05, 122.06, 122.08; 188/1.11 R, 188/1.11 W, 1.11 L, 1.11 E; 340/453, 454; 73/121, 126, 128, 129, 130

See application file for complete search history.

(56) References Cited

U.S. PATENT DOCUMENTS

| | | | |
|---|---|---|---|
| 3,841,712 A | 10/1974 | Syria | |
| 3,858,436 A | 1/1975 | Hines, Jr. et al. | |
| 4,520,663 A | 6/1985 | Moore et al. | |
| 4,567,757 A | 2/1986 | Melocik et al. | |
| 4,573,350 A | 3/1986 | Anderson | |
| 4,610,159 A | 9/1986 | Nowak | |
| 4,771,387 A | 9/1988 | Hexel et al. | |
| 5,201,834 A | 4/1993 | Grazioli et al. | |
| 5,315,520 A | 5/1994 | Drake et al. | |
| 5,373,219 A | 12/1994 | Grabowski et al. | |
| 6,206,489 B1 | 3/2001 | Schmidt et al. | |
| 6,828,746 B2 | 12/2004 | Kumar | |
| 6,893,058 B2 | 5/2005 | Kumar et al. | |
| 7,078,877 B2 | 7/2006 | Salasoo et al. | |
| 7,594,682 B2 | 9/2009 | Kumar et al. | |

*Primary Examiner* — Ruth Ilan
(74) *Attorney, Agent, or Firm* — Trego, Hines & Ladenheim, PLLC

(57) ABSTRACT

A method of testing a braking device in a drivetrain of a vehicle which includes at least one tractive element coupled to a traction motor. The method includes: (a) applying the braking device to a tractive element of the vehicle; (b) using an electronic controller, causing the traction motor to apply a predetermined force to the tractive element; and (c) using the controller, monitoring the tractive element for movement while the force is being applied. A dynamic braking or "retarder" function may also be tested. A system for carrying out the method is provided.

18 Claims, 6 Drawing Sheets

AUTOMATIC BRAKE VERIFICATION SYSTEM

BACKGROUND OF THE INVENTION

This invention relates generally to motorized vehicles, and more particularly to verification of braking performance in such vehicles.

Off-highway vehicles, such as mining trucks, are typically provided with a drivetrain in which an internal combustion engine drives a generator that provides electrical current to one or more traction motors. Off highway vehicles typically also utilize dynamic or electric braking in addition to hydraulically or mechanically operated service friction brakes.

The braking systems of such large vehicles are critical and must be verified before operation. Prior art braking systems must be manually verified. To test the dynamic braking function the vehicle must be in motion. To test the service brakes the vehicle must be in motion. To test the parking brake the truck must be loaded and put on a grade. Such tests are time consuming and depend on inconsistent operator judgment.

BRIEF SUMMARY OF THE INVENTION

These and other shortcomings of the prior art are addressed by the present invention, which provides a system and method for automatically testing the braking systems of a vehicle by applying loads to the drivetrain while monitoring the drivetrain components.

According to one aspect of the invention, a method is provided for testing a braking device in a drivetrain of a vehicle which includes at least one tractive element coupled to a traction motor. The method includes: (a) applying the braking device to a tractive element of the vehicle; (b) using an electronic controller, causing the traction motor to apply a predetermined force to the tractive element; and (c) using the controller, monitoring the tractive element for movement while the force is being applied.

According to another aspect of the invention, a method is provided for testing a retarder function in a drivetrain of a vehicle which includes at least one tractive element coupled to an electric traction motor, at least one electric energy absorbing device coupled to the traction motor, and at least one power source driven by a prime mover and coupled to the traction motor. The method includes: (a) applying the braking device to a tractive element of the vehicle; (b) using an electronic controller, commanding the traction motor to apply a predetermined force to the tractive element, while monitoring the tractive element for presence of the force; (c) using the electronic controller, coupling the electric energy absorbing device to the power source while monitoring the electric energy absorbing device for current flow therethrough; and (d) if the applied force is present at the wheel in step (b) and current is present in the electric energy absorbing device in step (c), declaring the retarder function to be operational.

According to another aspect of the invention, a method is provided for testing a braking device in a drivetrain of a vehicle which includes at least one tractive element coupled to an electric traction motor. The method includes: (a) applying the braking device to the tractive element; (b) computing an expected braking force applied to the tractive element based on a measured braking parameter; (c) calculating an actual braking force being applied to the tractive element based on vehicle deceleration; and (d) comparing the actual force to the expected braking force to determine braking effectiveness.

According to another aspect of the invention, a system for testing a braking device in a drivetrain of a vehicle includes: (a) a prime mover coupled to a power source; (b) at least one electric traction motor electrically coupled to the power source, the traction motor coupled to at least one tractive element; (c) at least one braking device arranged to act on the tractive element; and (d) an electronic controller operably connected to the traction motor. The controller is programmed to: (i) cause the traction motor to apply a predetermined force to the tractive element while the braking device is applied to the tractive element; and (ii) monitor the tractive element for movement while the force is being applied.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
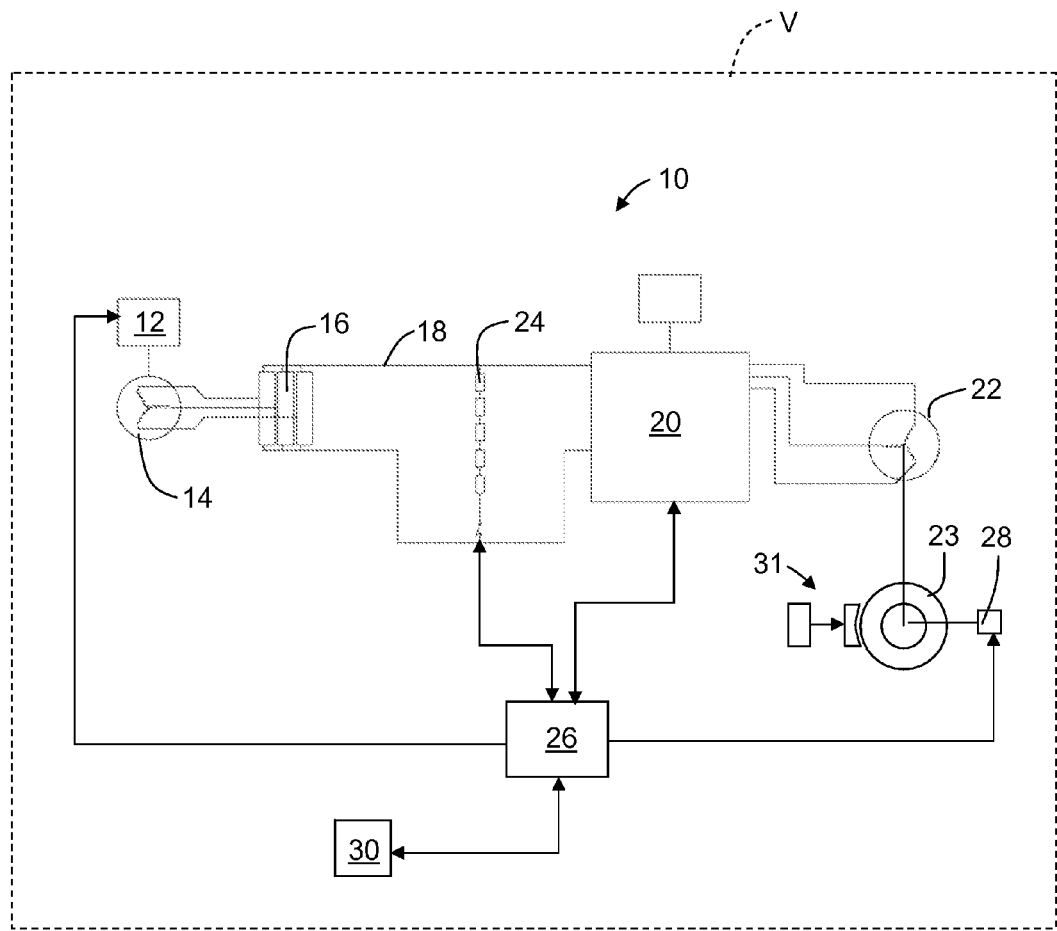
FIG. 1 is a block diagram of a drive system for a vehicle constructed in accordance with an aspect of the present invention.

Referring to the drawings wherein identical reference numerals denote the same elements throughout the various views, FIG. 1 depicts an exemplary drive system 10 for use in a vehicle "V". The drive system 10 includes a prime mover 12 such as a Diesel engine which drives an alternator 14. The output of the alternator 14 is converted into DC via a rectifier bank 16. The DC power is provided over a DC bus 18 to an inverter unit 20. The inverter unit 20 includes DC-to-AC conversion circuitry of a known type, and also employs components such as Insulated Gate Bipolar Transistors (IGBTs) or thyristors operating as pulse width modulators (not shown) to provide a AC power to a traction motor 22 which is coupled to a wheel 23 through a reduction gear (not shown). For the sake of illustrative simplicity, only one inverter unit 20 and traction motor 22 are shown, with the understanding that the vehicle V may be provided with multiple traction motors 22 driven by multiple inverter units 20.

While an AC-DC-AC system is described herein, is should be noted that the principles of the present invention may be applied to other drivetrain configurations, e.g. using an alternator or DC generator as a power source, and using AC or DC traction motors. Furthermore, the principles of the present invention are also applicable to other types of vehicles, such as rail vehicles or road vehicles. The vehicle V may use any type of element adapted to exert a tractive force. Examples of tractive elements include wheels, axles, or translating or reciprocating structures. The term "traction motor" could encompass, for example, electric or hydraulic linear motors or actuators.

One or more chains of grid resistors 24 are connected across the DC bus 18. The grid resistors 24 may be selectively coupled to the DC bus 18 to dissipate power generated by the traction motor 22 and thereby provide dynamic breaking.

This is referred to as a "retarder" function. Other electrical energy absorbing devices may be used in place of the grid resistors 24 to dissipate and/or use the power generated, for example batteries, a regenerative system, or equipment to use the power like auxiliary systems and accessories.

The vehicle V includes at least one braking device 31 of a known type. The braking device 31 may be a service, parking, or emergency brake, and may be hydraulically, mechanically, or electrically operated. Most typically, the vehicle V would include a service brake system plus an emergency or parking brake system.

A microprocessor-based controller 26 has operative connections to the prime mover 12, the grid resistors 24, the inverter unit 20, and to numerous sensors within the drive train, such as a wheel speed sensor 28 of a known type coupled to the wheel 23. Among other functions, the controller 26 has the capability to control the speed of the prime mover 12, to command the inverter unit 20 to apply current to drive the traction motor 22 in a forward or reverse direction, to modulate the current level supplied to the traction motor 22, and to connect the traction motor 22 to the grid resistors 24 through the inverter unit 20 to effect the retarder function. In addition to the various discrete sensors, the controller 26 is provided with feedback from the inverter unit 20 which is indicative of the magnitude of the torque being applied to the traction motor 22.

Figure 2:
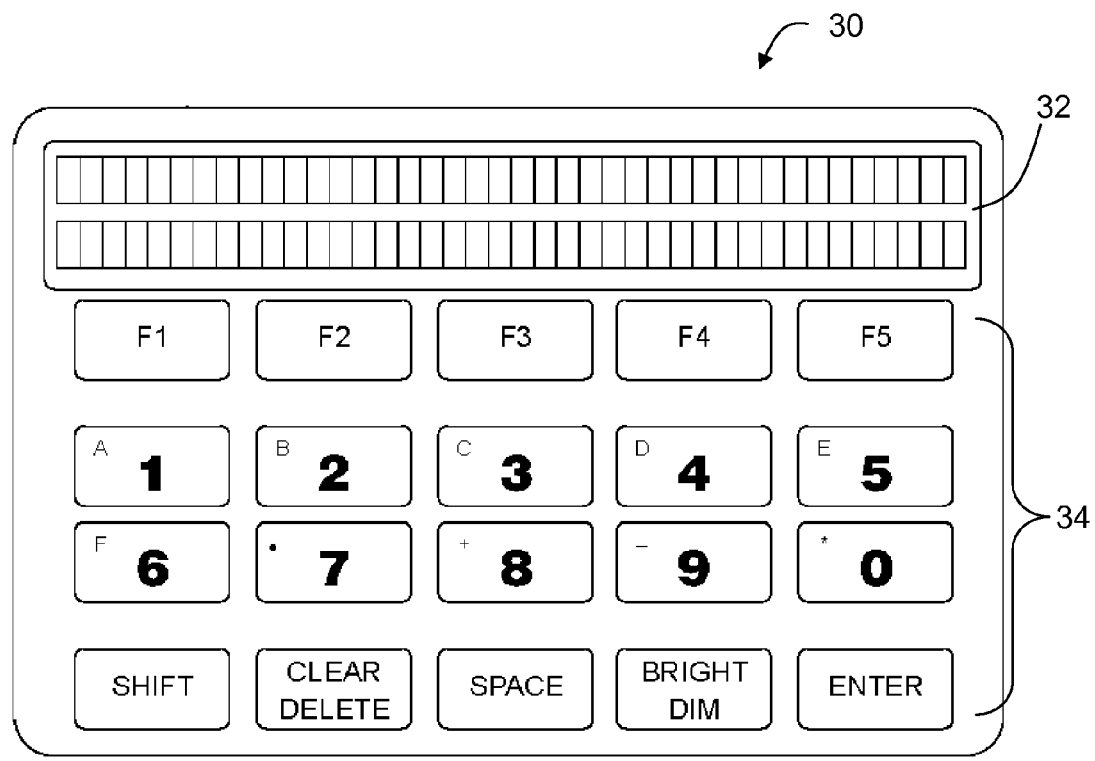
FIG. 2 is a schematic view of a driver control panel of the drive system of FIG. 1.

A control panel 30, also referred to as a "driver information display" is coupled to the controller 26. As shown in FIG. 2, the control panel 30 includes a display 32 for presenting information to the driver, and one or more controls 34 for operating the vehicle V. In the illustrated example the display 32 is a multi-line LED, and the controls 34 are configured as a plurality of fixed and configurable keys. It will be understood that the control panel 30 could be configured differently, for example it could take the form of a touch screen interface.

Figure 3:
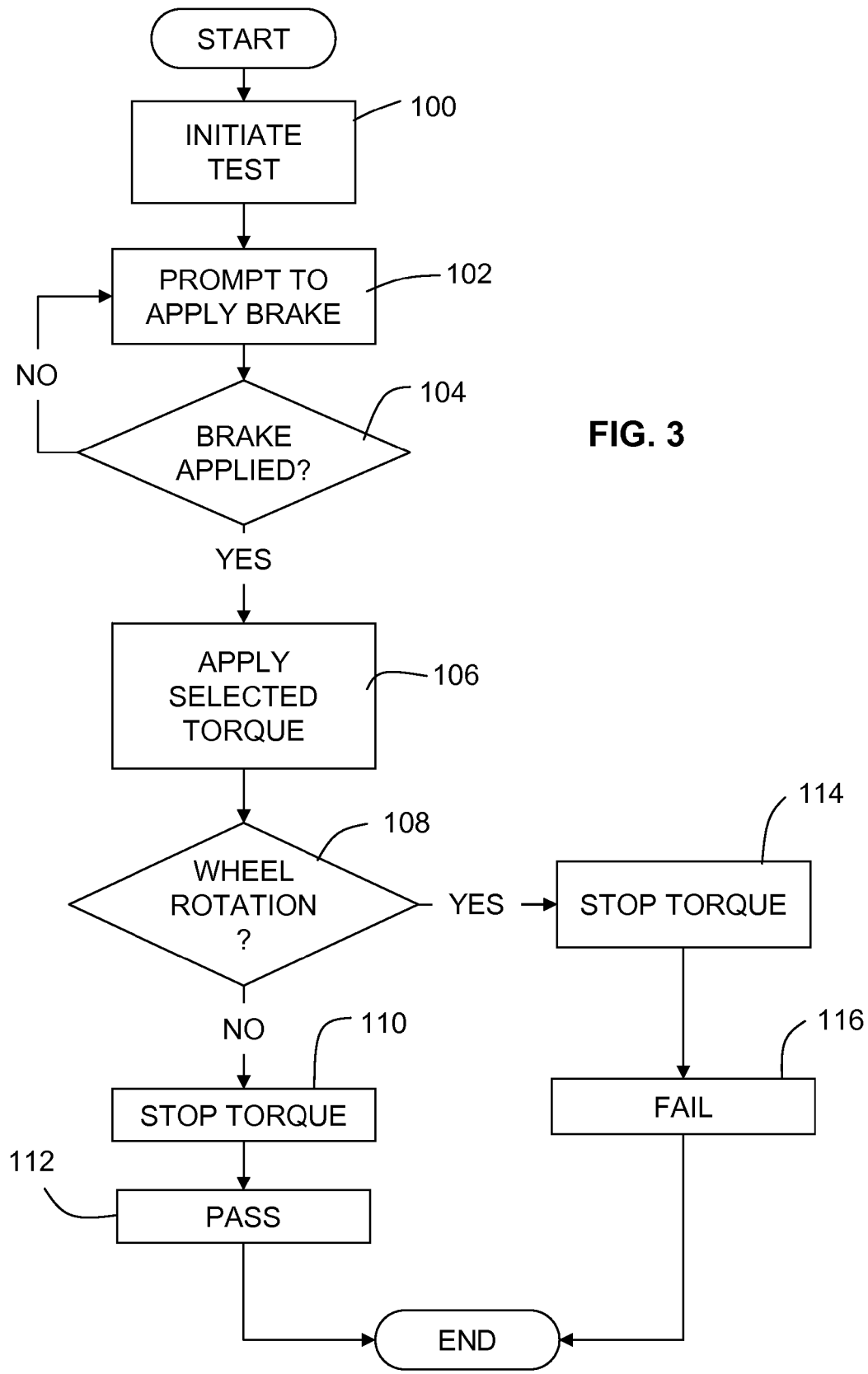
FIG. 3 is a flowchart illustrating a braking verification procedure according to an aspect of the present invention.

FIG. 3 illustrates an exemplary procedure for testing braking functions of the vehicle V. In the present example, the procedure is implemented as software running on the controller 26. The procedure could also be implemented on one or more separate devices coupled to the controller 26 and/or drive system 10. At block 100, the test is initiated, for example by the driver operating a switch or making a menu selection on the control panel 30. The driver is then prompted to apply the brake, for example by a message on the display 32 (see block 102). Optionally, the controller 26 may have an interface to the braking system of the vehicle V, in which case the controller 26 would send a command to apply the brakes. The term "brakes" as used with respect to all of the test procedures described herein may refer to service, parking, or emergency brakes, irrespective of their method of operation. If more than one type of braking system is present, they would be separately or collectively tested, and if more than one wheel 23 is powered, they may be tested separately or collectively.

Optionally, the system may check whether brakes have been applied before proceeding further (see block 104). Once brake application is confirmed, a selected torque is applied to the traction motor 22, at block 106. If the traction motor 22 is a linear device, it will be understood that a force is applied instead of a torque. The torque may be commanded by the controller 26 without driver intervention. Optionally, the system may prompt the driver to depress the vehicle's accelerator pedal in order to authorize the system to apply torque. This avoids surprising the driver with an unexpected operation. The magnitude of the torque is such that the vehicle wheel 23 should not rotate. If the tractive element is not a wheel, it is monitored for motion rather than rotation. For example, the selected torque may be equal to the maximum torque that the brakes are specified to hold, plus a margin of safety. While the torque is being applied, the wheel 23 is monitored for rotation, at block 108. If the driver has been prompted to depress the accelerator, the system may illuminate a light or present a message to the driver on the display 32 to indicate that the intended torque level has been reached, allowing him to evaluate whether or not the vehicle V is moving. If the wheel 23 remains stationary with torque applied, the torque is removed at block 110, and the system declares the test "passed" at block 112. If the wheel 23 rotates, the torque is removed at block 114, and the test is declared "failed" at block 116. When the test is completed, the driver is informed of the test results, for example by a message on the display 32. The time, date, and test parameters may be stored for future reference.

Figure 4:
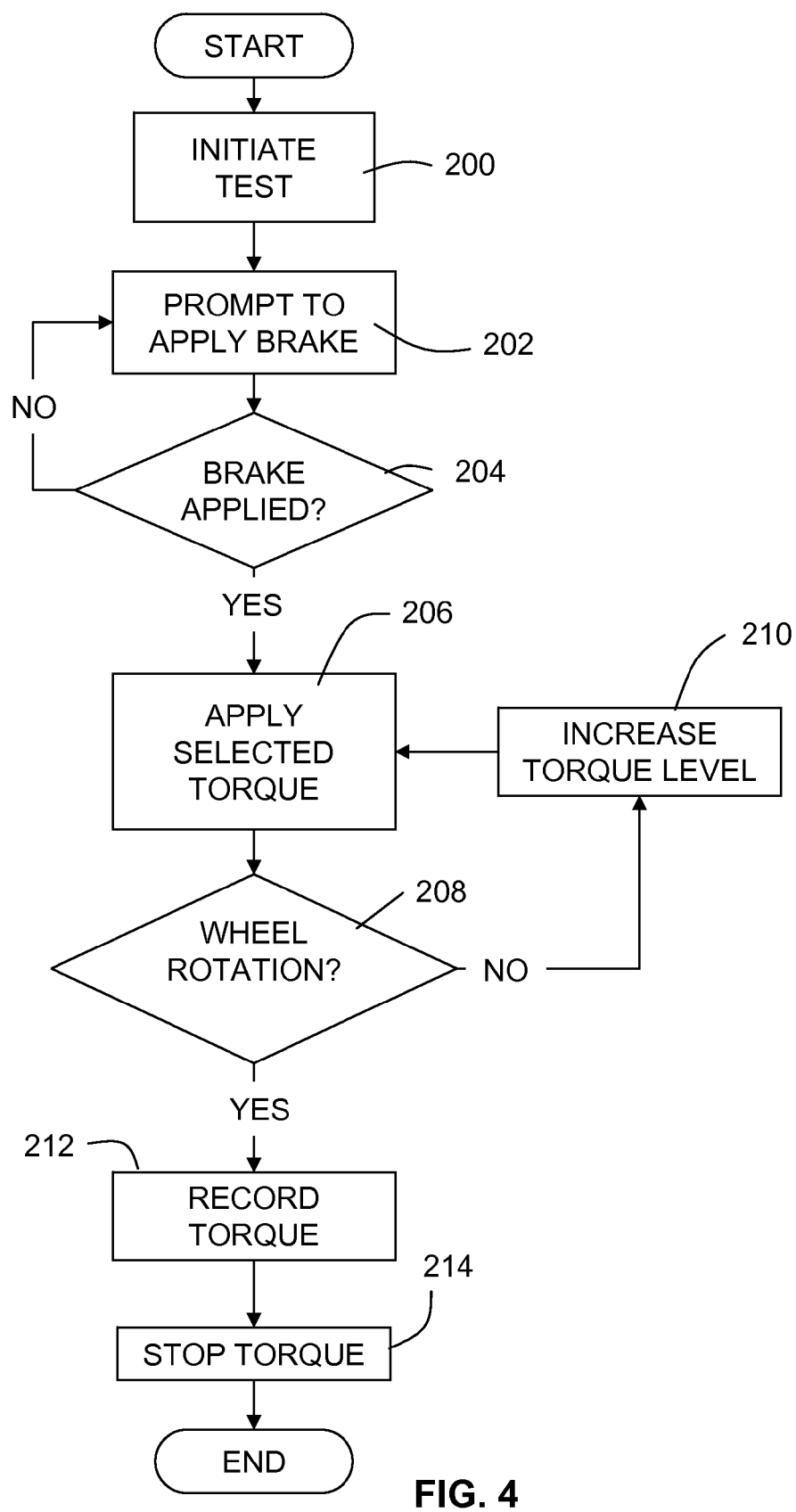
FIG. 4 is a flowchart illustrating an alternative braking verification procedure.

FIG. 4 illustrates a test procedure similar to the one in FIG. 3. At block 200, the test is initiated, for example by the driver operating a switch or making a menu selection on the control panel 30. The driver is then prompted to apply the brake, for example by a message on the display 32 shown in FIG. 2 (see block 202). Optionally, the controller 26 may have an interface to the braking system of the vehicle, in which case the controller 26 would send a command to apply the brakes.

Optionally, the system may confirm that brakes have been applied before proceeding further (see block 204). Once brake application is confirmed, a selected torque is applied to the traction motor 22 (block 206). The magnitude of the torque is substantially lower than would cause the wheel 23 to rotate, even if the brakes are in a degraded condition. While the torque is being applied, the wheel 23 is monitored for rotation (block 208). If the wheel 23 remains stationary with torque applied, the torque is increased at block 210, while monitoring for wheel rotation continues. Eventually the torque will be sufficient to rotate the wheel 23 regardless of brake condition. This value is referred to as the "breakout" torque. The breakout torque is recorded at block 212, and then torque is stopped at block 214. When the test is completed, the driver is informed of the test results, for example by a message on the display 32. The driver may then evaluate whether the system is suitable for operation. The time, date, and test parameters may be stored for future reference.

Figure 5:
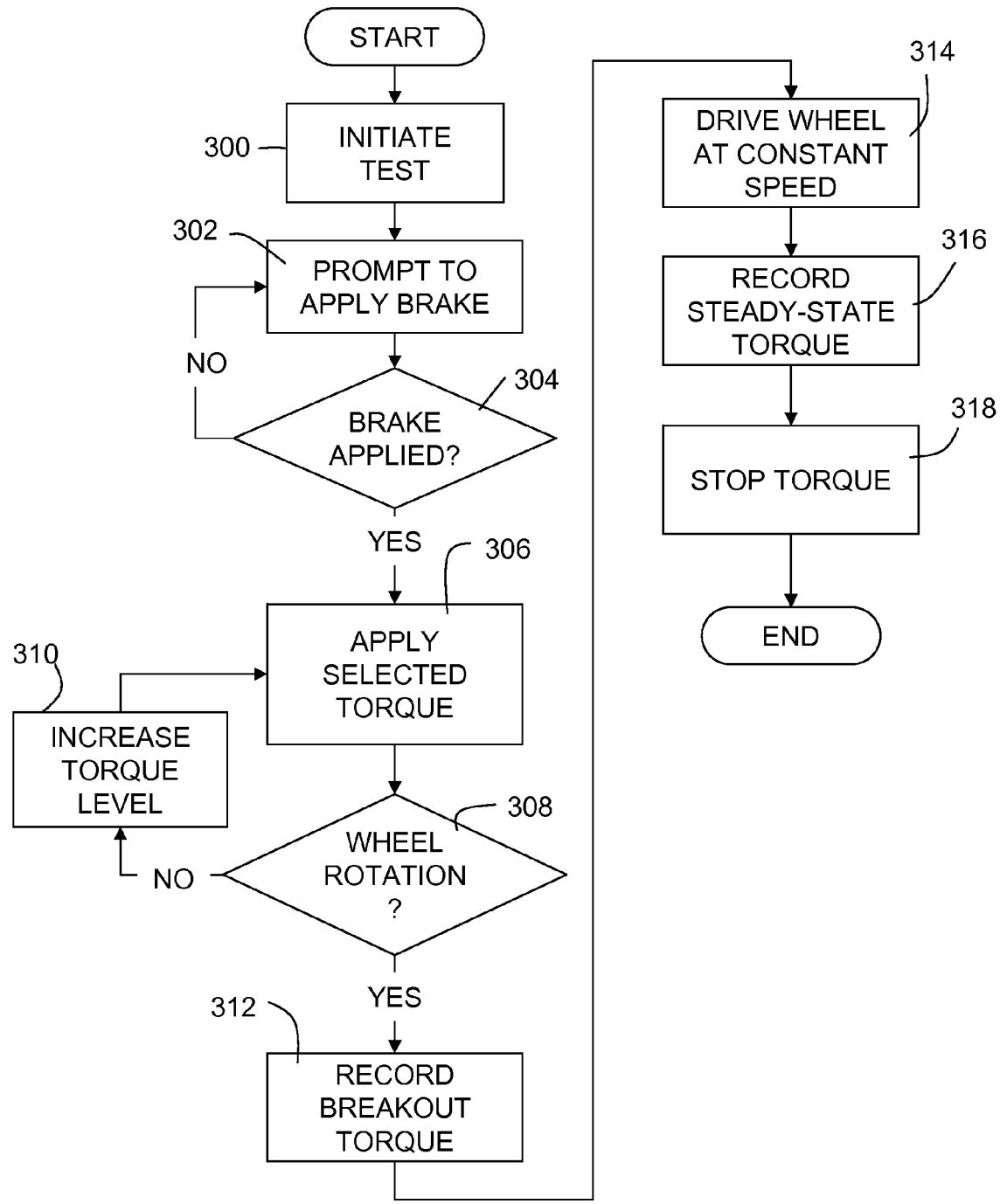
FIG. 5 is a flowchart illustrating another alternative braking verification procedure.

FIG. 5 illustrates another example test procedure. At block 300, the test is initiated, for example by the driver operating a switch or making a menu selection on the control panel 30. The driver is then prompted to apply the brake, for example by a message on the display 32 (block 302). Optionally, the controller 26 may have an interface to the braking system of the vehicle V, in which case the controller 26 would send a command to apply the brakes.

Optionally, the system may confirm that brakes have been applied before proceeding further (see block 304). Once brake application is confirmed, a selected torque is applied to the traction motor 22, at block 306. The magnitude of the torque is substantially lower than would cause the wheel 23 to rotate, even if the brakes were in a degraded condition. While the torque is being applied, the wheel 23 is monitored for rotation, at block 308. If the wheel 23 remains stationary with torque applied, the torque is increased at block 310, while monitoring for wheel rotation continues. Eventually the torque will be sufficient to rotate the wheel 23 regardless of brake condition. This value is referred to as the "breakout" torque. The breakout torque is recorded at block 312.

Next, at block 314, the torque is modulated to drive the wheel 23 at a constant angular speed. The steady-state torque value will be less than the breakout torque. This is referred to as the "drive-through" torque. The steady-state torque is recorded at block 316, and then the torque is stopped at block 318. When the test is completed, the driver is informed of the test results, for example by a message on the display 32. The driver may then evaluate whether the system is suitable for operation. The time, date, and test parameters may be stored for future reference.

Figure 6:
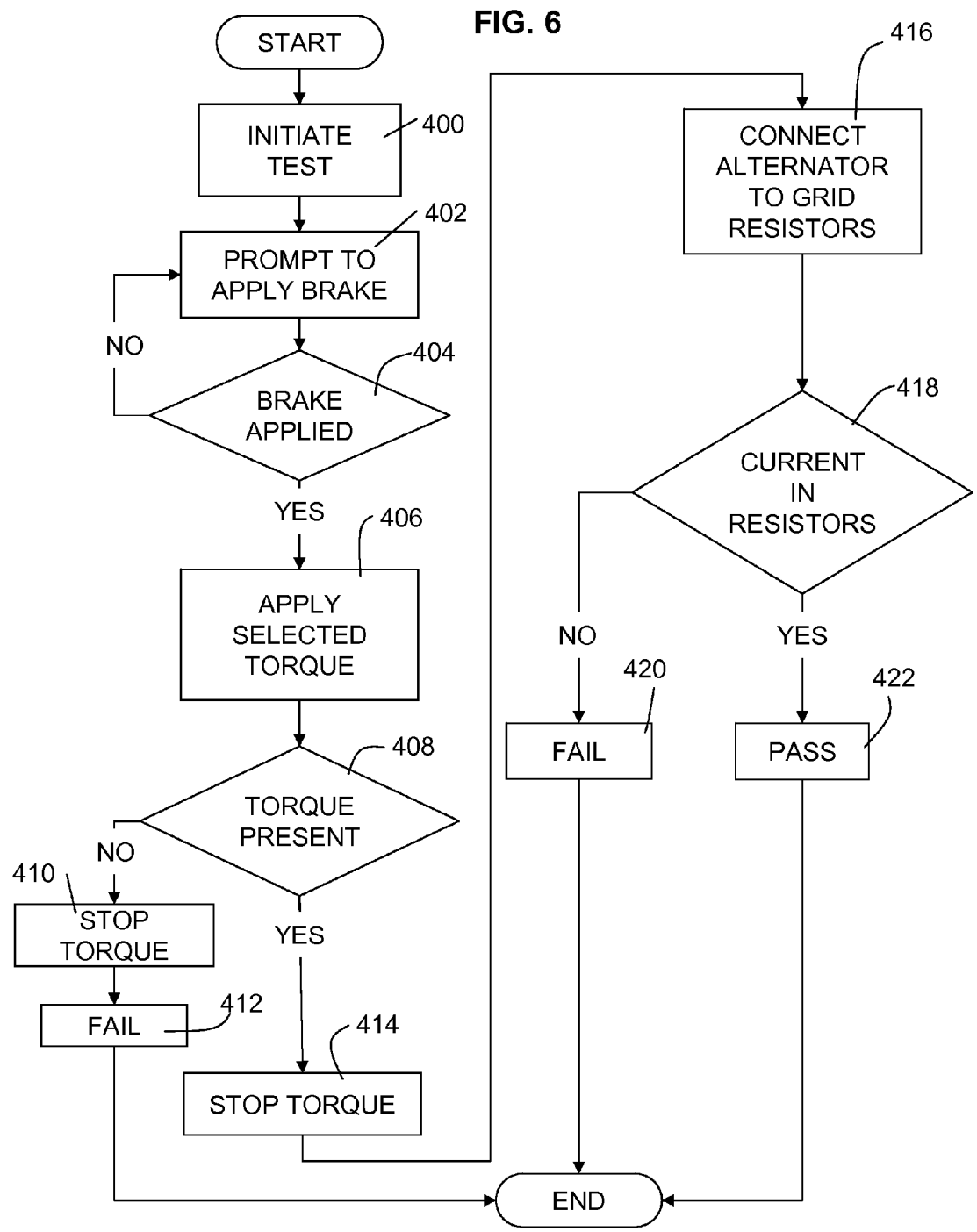
FIG. 6 is a flowchart illustrating a procedure for verifying operation of a retarder function of the drive system.

FIG. 6 illustrates a procedure for testing the retarder function. At block 400, the test is initiated, for example by the driver operating a switch or making a menu selection on the control panel 30. The driver is then prompted to apply the brake, for example by a message on the display 32 (see block 402). Optionally, the controller 26 may have an interface to the braking system of the vehicle, in which case the controller would send a command to apply the brakes.

Optionally, the system may confirm that brakes have been applied before proceeding further (see block 404). Once brake application is confirmed, a selected torque is applied to the traction motor 22 (block 406). The magnitude of the torque is not critical for this test, but for convenience may be selected such that the vehicle wheels would not rotate, regardless of brake condition. While the torque is being applied, feedback from the inverter unit 20 is monitored at block 408 to confirm that the traction motor 22 is in fact generating torque. Presence of torque verifies correct operation of the DC bus 18, the inverter unit 20, and the traction motor 22. Optionally, torque generated by the traction motor 22 may be monitored and verified while the vehicle V is in motion.

If no torque is present, or the torque is substantially less than commanded, the torque is removed at block 410, and the system declares the test "failed" at block 412. If the expected torque is present, the test is declared the torque is removed at block 414.

Next the alternator or other electrical power source 14 is coupled to the grid resistors 24 or other electrical energy absorbing device, at block 416. The chain of grid resistors 24 or other absorbing device is tested for current flow at block 418. If no current is flowing, the test is declared "failed" at block 420. If current is flowing through the chain of grid resistors 24, the test is declared "passed" at block 422. The vehicle V may have multiple chains of grid resistors 24, and they may be tested individually, all at once, or in incremental combinations, to confirm their energy dissipation capacity. This procedure tests each component required for operation of the retarder (grid resistors 24, DC bus 18, inverter unit 20, and the traction motor 22, while the vehicle V is stationary. If each of these components are working, the retarder function may be assumed to be operational with a high degree of confidence.

When the test is completed, the driver is informed of the test results, for example by a message on the display 32. The time, date, and test parameters may be stored for future reference.

Optionally, the test of the retarder function may take place in parallel with the test of the service or parking brakes, rather than as a separate test. The prime mover 12 and the alternator 14 will have capacity beyond that needed to apply maximum desired torque to the traction motor 22. To accomplish testing in parallel, the grid resistors 24 may simply be coupled to the alternator 14, and tested for current flow as described above, while torque is being applied to the traction motor 22.

The procedures above have described "go/no-go" or simple beginning of work shift tests. However, it is also possible to use the system described herein to perform more sophisticated evaluation of the braking effectiveness of the vehicle V. For example, if the weight of the vehicle V and the grade the vehicle V is operating on are known, this information along vehicle deceleration can be used to compute actual torque applied by the brakes. This value can be compared to expected brake torque computed, for example, from measured brake line hydraulic pressure. Current flow through the grid resistors 24 can be monitored and compared to expected current whenever they are used for the retarder function or used to load the alternator 14. Another technique is to compare the actual deceleration or electrical braking torque or braking power generated for a given braking system request by the operator. This comparison may take into account system failures and/or known or expected derations (like thermal or leakage current limitations). Another technique is compare the acceleration change during motoring and braking operations (in the time required to changeover from motoring to braking, it is presumed that no significant change in vehicle weight or grade). These calculations and comparisons could be performed on a repetitive basis and trends based on changes from earlier effectiveness evaluations may be used to warn the next work shift.

The foregoing has described a method for verifying operation of a braking function of a drive system. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of testing a braking device in a drivetrain of a vehicle which includes at least one tractive element coupled to an electric traction motor, the method comprising:
   (a) prompting a driver to apply the braking device;
   (b) subsequent to the prompt, applying the braking device to the tractive element;
   (c) using an electronic controller, causing the traction motor to apply a predetermined force to the tractive element; and
   (d) using the controller, monitoring the tractive element for movement while the force is being applied.

2. The method of claim 1 wherein:
   (a) the predetermined force is of a magnitude that should not cause movement of the tractive element when the braking device is applied, if the braking device is operating properly; and
   (b) the braking device is declared to be operating properly if the tractive element does not move during the test.

3. The method of claim 1 further comprising using the controller to apply the braking device before applying the predetermined force to the tractive element.

4. The method of claim 1 further comprising using the controller to confirm that the braking device is applied before applying the predetermined force to the tractive element.

5. The method of claim 1 wherein the braking device is a friction service brake.

6. The method of claim 1 wherein the braking device is a friction parking brake.

7. The method of claim 1 further comprising displaying the results of the test to the driver.

8. The method of claim 1 further comprising storing at least one parameter representative of the test for later retrieval.

9. The method of claim 1 further comprising:
   (e) initially setting the predetermined force at a magnitude that will not cause movement of the tractive element when the braking device is applied;
   (f) increasing the force until movement of the tractive element occurs; and (g) recording the magnitude of the force which causes movement of the tractive element.

10. The method of claim 9 further comprising:

(h) after step (g), modulating the force applied to the tractive element so as to drive the tractive element at a substantially constant speed; and (i) recording the force required to drive the tractive element at the substantially constant speed.

11. A system for testing a braking device in a drivetrain of a vehicle, comprising:

(a) a prime mover coupled to a power source;

(b) at least one electric traction motor electrically coupled to the power source, the traction motor coupled to at least one tractive element;

(c) at least one braking device arranged to act on the tractive element; and (d) an electronic controller operably connected to the traction motor, the controller configured to:

(i) prompt a driver to apply the braking device before applying the predetermined force to the tractive element;

(ii) subsequent to the prompt, cause the traction motor to apply a predetermined force to the tractive element while the braking device is applied to the tractive element; and (iii) monitor the tractive element for movement while the force is being applied.

12. The system of claim 11 wherein:

(a) the predetermined force is of a magnitude that should not cause movement of the tractive element when the braking device is applied, if the braking device is operating properly; and (b) the controller is programmed to declare the braking device to be operating properly if the tractive element does not move during the test.

13. The system of claim 11 wherein the controller is further programmed to apply the braking device before applying the predetermined force to the tractive element.

14. The system of claim 11 wherein the controller is further programmed to confirm that the braking device is applied before applying the predetermined force to the tractive element.

15. The system of claim 11 wherein the controller is further programmed to display the results of the test to the driver.

16. The system of claim 11 wherein the controller is further programmed to store at least one parameter representative of the test for later retrieval.

17. The system of claim 11 wherein the controller is programmed to:

(iv) initially set the predetermined force at a magnitude that will not cause motion of the tractive element when the braking device is applied;

(v) increase the force until movement of the tractive element occurs; and (vi) record the magnitude of the force which causes movement of the tractive element.

18. The system of claim 17 wherein the controller is further programmed to:

(vii) after step (vi), modulate the force applied to the tractive element as to drive the tractive element at a substantially constant speed; and (viii) record the force required to drive the tractive element at the substantially constant speed.

* * * * *